(12) United States Patent
Williamson et al.

(10) Patent No.: US 10,724,924 B2
(45) Date of Patent: Jul. 28, 2020

(54) SYSTEM AND METHOD FOR DETERMINING WHETHER AN ENGINE IS ON OR OFF BASED ON A PRESSURE OF EXHAUST GAS PRODUCED BY THE ENGINE

(71) Applicant: AVL TEST SYSTEMS, INC., Plymouth, MI (US)

(72) Inventors: James Patrick Williamson, Dexter, MI (US); William Martin Silvis, Ann Arbor, MI (US)

(73) Assignee: AVL TEST SYSTEMS, INC., Plymouth, MI (US)

( * ) Notice: Subject to any disclaimer, the term of this patent is extended or adjusted under 35 U.S.C. 154(b) by 189 days.

(21) Appl. No.: 16/117,180

(22) Filed: Aug. 30, 2018

(65) Prior Publication Data

US 2019/0078978 A1 Mar. 14, 2019

Related U.S. Application Data

(60) Provisional application No. 62/557,968, filed on Sep. 13, 2017.

(51) Int. Cl.
*G01M 15/10* (2006.01)

(52) U.S. Cl.
CPC .................. *G01M 15/106* (2013.01)

(58) Field of Classification Search
CPC ............................ G01M 15/10; G01M 15/106
USPC ........................................ 73/114.69, 114.76
See application file for complete search history.

(56) References Cited

U.S. PATENT DOCUMENTS

| 9,518,897 | B2 | 12/2016 | Williamson et al. |
| 2012/0160009 | A1 | 6/2012 | Asami et al. |
| 2019/0391044 | A1* | 12/2019 | Williamson ........ G01M 15/102 |
| 2019/0391121 | A1* | 12/2019 | Williamson ......... G01N 33/007 |

FOREIGN PATENT DOCUMENTS

EP 3505904 A1 7/2019

OTHER PUBLICATIONS

Search Report dated Aug. 1, 2019 corresponding to German Patent Application No. 10 2018 122 168.1, 7 pages.

* cited by examiner

*Primary Examiner* — Eric S. McCall
(74) *Attorney, Agent, or Firm* — Harness, Dickey & Pierce, P.L.C.

(57) ABSTRACT

A system according to the present disclosure includes a pressure sensor and an engine state module. The pressure sensor is configured to measure pressure in an exhaust gas supply line that supplies exhaust gas from an engine to an emissions measurement system. The emissions measurement system includes a dilution tunnel, a sample probe, and a sample collector. The exhaust gas is diluted with a dilution gas in the dilution tunnel, and the sample probe supplies a portion of the diluted exhaust gas to the sample collector. The engine state module is configured to determine whether the engine is on or off based on at least one of (i) a frequency of pulsations in the exhaust gas supply line pressure and (ii) a magnitude of the pulsations in the exhaust gas supply line pressure.

20 Claims, 6 Drawing Sheets

SYSTEM AND METHOD FOR DETERMINING WHETHER AN ENGINE IS ON OR OFF BASED ON A PRESSURE OF EXHAUST GAS PRODUCED BY THE ENGINE

CROSS-REFERENCE TO RELATED APPLICATIONS

This application claims the benefit of U.S. Provisional Application No. 62/557,968, filed on Sep. 13, 2017. The entire disclosure of the application referenced above is incorporated herein by reference.

FIELD

The present disclosure relates to emissions test systems, and more particularly, to systems and methods for determining whether an engine is on or off based on a pressure of exhaust gas produced by the engine.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Emissions test systems collect exhaust gas produced by an engine and measure the concentrations of emissions in the exhaust gas. The concentration of an emission measured during a period is multiplied by the mass flow rate of exhaust gas during that period to obtain the mass flow rate of the emission. The mass flow rate of the emission is then multiplied by the duration of the period to obtain the total mass of the emission in the exhaust gas produced by the engine during the period.

A constant volume sampling (CVS) system is a type of emissions test system that enables determining the mass of emissions in exhaust gas without measuring the flow rate of the exhaust gas, which simplifies emission mass determinations. A CVS system typically includes a dilution tunnel in which exhaust gas and a dilution gas are mixed, a sample probe that directs a portion of the diluted exhaust gas from the dilution tunnel to a sample collector, and a blower disposed downstream of the dilution tunnel. The blower draws a constant volume of diluted exhaust gas through the dilution tunnel. Thus, the exhaust gas flow rate may be determined by subtracting the flow rate of the dilution gas from the flow rate of the diluted exhaust gas.

SUMMARY

A system according to the present disclosure includes a pressure sensor and an engine state module. The pressure sensor is configured to measure pressure in an exhaust gas supply line that supplies exhaust gas from an engine to an emissions measurement system. The emissions measurement system includes a dilution tunnel, a sample probe, and a sample collector. The exhaust gas is diluted with a dilution gas in the dilution tunnel, and the sample probe supplies a portion of the diluted exhaust gas to the sample collector. The engine state module is configured to determine whether the engine is on or off based on at least one of (i) a frequency of pulsations in the exhaust gas supply line pressure and (ii) a magnitude of the pulsations in the exhaust gas supply line pressure.

In one example, the engine state module is configured to determine that the engine is on when the frequency of the pulsations in the exhaust gas supply line pressure is greater than or equal to a predetermined frequency.

In one example, the engine state module is configured to determine that the engine is on when the magnitude of the pulsations in the exhaust gas supply line pressure is greater than or equal to a predetermined value.

In one example, the engine state module is configured to determine the magnitude of the pulsations in the exhaust gas supply line pressure based on a difference between a maximum value of one of the pulsations and a minimum value of one of the same pulsation or one of the pulsations immediately before or after the same pulsation.

In one example, the engine state module is configured to determine whether the engine is on or off based on both the frequency of the pulsations in the exhaust gas supply line pressure and the magnitude of the pulsations in the exhaust gas supply line pressure.

In one example, the engine state module is configured to identify N of the pulsations that have a frequency which is greater than or equal to a predetermined frequency, and determine whether the engine is on or off based on the magnitudes of the N pulsations, wherein N is an integer.

In one example, the engine state module is configured to determine that the engine is on when an average value of the magnitudes of the N pulsations is greater than or equal to a predetermined value, wherein N is greater than one.

In one example, the pressure sensor is configured to measure the exhaust gas supply line pressure at a frequency that is greater than or equal to 1 kilohertz.

In one example, the system further comprises an emissions concentration sensor configured to measure a concentration of an emission in the exhaust gas, and an emissions mass module configured to determine a mass of the emission in the exhaust gas based on the measured emission concentration and whether the engine is on or off.

In one example, the system further comprises a valve control module configured to control a valve to regulate flow of the diluted exhaust gas from the dilution tunnel to the sample collector based on whether the engine is on or off.

A method according to the present disclosure includes measuring pressure in an exhaust gas supply line that supplies exhaust gas from an engine to an emissions measurement system. The emissions measurement system includes a dilution tunnel, a sample probe, and a sample collector. The exhaust gas is diluted with a dilution gas in the dilution tunnel, and the sample probe supplies a portion of the diluted exhaust gas to the sample collector. The method further includes determining whether the engine is on or off based on at least one of (i) a frequency of pulsations in the exhaust gas supply line pressure, and a magnitude of the pulsations in the exhaust gas supply line pressure.

In one example, the method further includes determining that the engine is on when the frequency of the pulsations in the exhaust gas supply line pressure is greater than or equal to a predetermined frequency.

In one example, the method further includes determining that the engine is on when the magnitude of the pulsations in the exhaust gas supply line pressure is greater than or equal to a predetermined value.

In one example, the method further includes determining the magnitude of the pulsations in the exhaust gas supply line pressure based on a difference between a maximum value of one of the pulsations and a minimum value of one of the same pulsation or one of the pulsations immediately before or after the same pulsation.

In one example, the method further includes determining whether the engine is on or off based on both the frequency of the pulsations in the exhaust gas supply line pressure and the magnitude of the pulsations in the exhaust gas supply line pressure.

In one example, the method further includes identifying N of the pulsations that have a frequency which is greater than or equal to a predetermined frequency, and determining whether the engine is on or off based on the magnitudes of the N pulsations, wherein N is an integer.

In one example, the method further includes determining that the engine is on when an average value of the magnitudes of the N pulsations is greater than or equal to a predetermined value, wherein N is greater than one.

In one example, the method further includes measuring the exhaust gas supply line pressure at a frequency that is greater than or equal to 1 kilohertz.

In one example, the method further includes measuring a concentration of an emission in the exhaust gas, and determining a mass of the emission in the exhaust gas based on the measured emission concentration and whether the engine is on or off.

In one example, the method further includes controlling a valve to regulate flow of the diluted exhaust gas from the dilution tunnel to the sample collector based on whether the engine is on or off.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a graph illustrating examples of the pressure of exhaust gas produced by an engine when the engine is off and when the engine is on;

In the drawings, reference numbers may be reused to identify similar and/or identical elements.

DETAILED DESCRIPTION

Figure 1:
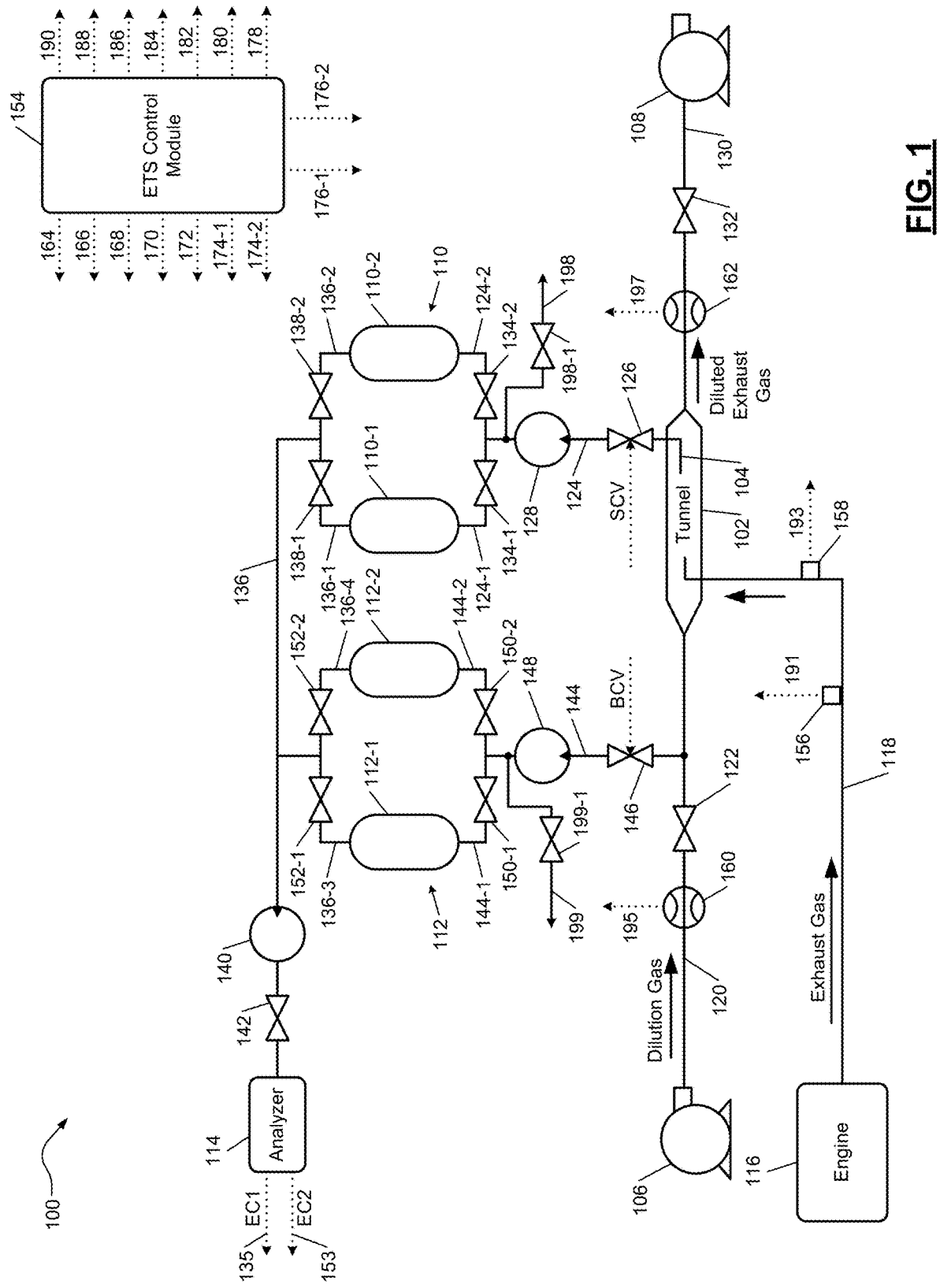
FIG. 1 is a schematic of an example emissions test system according to the principles of the present disclosure.

Emissions test schedules typically specify a vehicle speed that changes with respect to time. When a hybrid vehicle is subjected to these emissions test schedules, the engine of the hybrid vehicle is turned off when the motor of the hybrid vehicle is used to propel the vehicle. When the engine is off, the concentration of emissions measured by an emissions concentration sensor in an emissions test system may not be representative of the concentration of emissions in exhaust gas produced by the engine at that time. To this end, when the engine is on (i.e., operating), exhaust gas flows from the engine to the dilution tunnel, and the emissions concentration sensor measures the concentration of emissions in this exhaust gas. However, when the engine is off (i.e., not operating), exhaust gas may become stagnant (i.e., not flow) and/or flow backwards from the dilution tunnel to the engine. Therefore, when the engine is off, the emissions concentration sensor may indicate the concentration of emissions in backflow exhaust gas rather than the concentration of emissions of exhaust gas produced by the engine at that time.

In addition, when the engine is off, a sample collector in the emissions test system is filled with dilution gas alone. Thus, if the engine is off for an extended period during an emissions test schedule, the dilution ratio of the collected sample may be increased to a level that adversely affects the accuracy of the emissions mass determination. The dilution ratio of the collected sample is the ratio of dilution gas to exhaust gas.

To address these issues, an emissions test system may determine whether an engine is on or off, and make control decisions or emissions mass determinations based on whether the engine is on or off. For example, the emissions test system may determine the concentration of emissions in exhaust gas produced by an engine based on the output of an emissions concentration sensor when the engine is on, and set the emissions concentration equal to zero when the engine is off. In another example, the emissions test system may allow diluted exhaust gas to flow from a dilution tunnel to a sample collector when an engine is on, and prevent the flow of the diluted exhaust gas from the dilution tunnel to the sample collector when an engine is off. The emissions test system may control the flow of diluted exhaust gas from the dilution tunnel to the sample collector by opening or closing valves disposed therebetween.

An emissions test system may determine whether an engine is on or off based on an input from an engine speed sensor. However, it is time consuming and costly to instrument a vehicle with an engine speed sensor, and an interface for the engine speed sensor to communicate with an emissions test system has not been developed. An emissions test system may determine whether an engine is on or off by communicating with an on-board diagnostic (OBD) system on a vehicle being tested. However, communication between an OBD system and an emissions test system is typically slow, and there is sometimes a delay during a key on event.

An emissions test system may determine whether an engine is on or off by communicating with an engine control module onboard a vehicle being tested. However, this requires a proprietary interface, as there is no universal solution for communicating with an engine control module. An emissions test system may determine whether an engine is on or off by detecting electrical pulses in a spark plug wire or a fuel injector wire. However, this required connecting the emissions test system to a spark plug wire or a fuel injector wire, which may be difficult to access. In addition, this way of determining whether an engine is on or off may not work during certain engine control strategies such as cylinder deactivation.

An emissions test system may determine whether an engine is on or off based on an input from a sound meter that measures sound within an engine compartment containing the engine. However, determining whether an engine is on or off in this way requires a complex self-learning algorithm. In addition, determining whether an engine is on or off in this way is not sufficiently reliable for most engine test systems.

An emissions test system may determine whether an engine is on or off based on a change in a measured pressure of exhaust gas flowing through an exhaust gas supply line that extends from the engine to a dilution tunnel. However, modern CVS systems include a pressure compensation system that maintains the pressure in the exhaust gas supply line at a relatively constant value. Thus, the pressure compensation system makes it difficult to determine whether a change in the measured pressure of exhaust gas flowing through the exhaust gas supply line is due to the engine switching on or off or due to a change in engine load.

An emissions test system may determine whether an engine is on or off based on the flow rate of exhaust gas passing through the exhaust gas supply line. The exhaust gas flow rate may be measured using an exhaust flow meter, or the exhaust gas flow rate may be calculated by subtracting the flow rate of dilution gas entering a dilution tunnel from the flow rate of diluted exhaust gas exiting the dilution tunnel. However, it is difficult to determine whether an engine is on or off based on the measured exhaust flow rate, as an exhaust flow meter is typically sized for maximum exhaust flow (e.g., 300 cubic feet per minute (cfm)) rather than exhaust flow at idle speeds (e.g., 4-5 cfm). In addition, it is difficult to determine whether an engine is on or off based on the calculated exhaust flow rate because the exhaust flow rate is minimal relative to the flow rate of the dilution gas and the flow rate of the diluted exhaust gas.

An emissions test system according to the present disclosure determines whether an engine is on or off based on the frequency and/or magnitudes of pulsations in the pressure of exhaust gas produced by the engine resulting from combustion in cylinders of the engine. The exhaust gas pressure is measured in an exhaust gas supply line that extends from the engine to a dilution tunnel of the emissions test system. The exhaust gas pressure is measured at a frequency that is high enough (e.g., 1 kHz or higher) to measure the pulsations in the exhaust gas pressure.

In one example, the emissions test system determines that an engine is on when the frequency of pulsations in the exhaust gas pressure is greater than a predetermined frequency. In another example, the emissions test system determines that an engine is on when the magnitude of pulsations in the exhaust gas pressure is greater than a predetermined value. In yet another example, the emissions test system identifies pulsations in the exhaust gas pressure having a frequency greater than the predetermined frequency, and determines that the engine is on when the average value of the magnitudes of those pulsations is greater than the predetermined value.

Determining whether an engine is on or off based on the frequency and/or magnitudes of pulsations in the pressure of exhaust gas produced by the engine yields more accurate results that other methods of determining whether an engine is on or off. In addition, instrumenting an exhaust gas supply line with a pressure sensor is easier and less expensive than adding other instrumentation used to determine whether an engine is on or off. Further, the pattern of pulsations in the exhaust gas pressure is the same at any location along the exhaust gas supply line, which provides flexibility in the placement of the exhaust gas pressure sensor.

Referring now to FIG. 1, an example emissions test system 100 includes a dilution tunnel 102, a sample probe 104, an upstream blower 106, a downstream blower 108, one or more sample collectors 110, one or more background collectors 112, and/or an emissions analyzer 114. The dilution tunnel 102 receives exhaust gas produced by an engine 116 through an exhaust gas supply line 118. The exhaust gas supply line 118 supplies the exhaust gas from the engine 116 to the dilution tunnel 104.

The dilution tunnel 102 also receives a dilution gas through a dilution gas supply line 120. The upstream blower 106 is disposed upstream of the dilution tunnel 102, and the upstream blower 106 sends the dilution gas through the dilution gas supply line 120 and to the dilution tunnel 102. The dilution gas may be ambient air, in which case the upstream blower 106 may draw the dilution gas from the surrounding environment. The upstream blower 106 may be a variable speed blower, and the speed of the upstream blower 106 may be adjusted to adjust the rate at which the dilution gas flows through the dilution tunnel 102. Additionally or alternatively, a valve 122 may be disposed in the dilution gas supply line 120, and the position of the valve 122 may be adjusted to adjust the flow rate of the dilution gas through the dilution tunnel 102.

The exhaust gas from the engine 116 is diluted with the dilution gas in the dilution tunnel 102. The sample probe 104 extracts a sample of the diluted exhaust gas, and a sample collector supply line 124 supplies the diluted exhaust gas sample from the sample probe 104 to the sample collectors 110. Thus, the sample probe 104 and the sample collector supply line 124 cooperate to supply the diluted exhaust gas sample from the dilution tunnel 102 to the sample collectors 110.

A valve 126 may be disposed in the sample collector supply line 124, and the position of the valve 126 may be adjusted to adjust the rate at which the diluted exhaust gas sample is extracted from the dilution tunnel 102. Additionally or alternatively, a pump 128 may be disposed in the sample collector supply line 124, and the speed of the pump 128 may be adjusted to adjust the rate at which the diluted exhaust gas sample is extracted from the dilution tunnel 102. In one example, the pump 128 is operated at a constant speed, and the position of the valve 126 is adjusted to adjust the extraction rate of the diluted exhaust gas.

The portion of the diluted exhaust gas that is not extracted by the sample probe 104 is expelled from the dilution tunnel 102 to the atmosphere through a dilution tunnel exhaust line 130. A valve 132 may be disposed in the dilution tunnel exhaust line 130, and the position of the valve 132 may be adjusted to adjust the rate at which the diluted exhaust gas flows through the dilution tunnel 102. Additionally or alternatively, the downstream blower 108 may be disposed downstream of the dilution tunnel 102, and the speed of the downstream blower 108 may be adjusted to adjust the rate at which the diluted exhaust gas flows through the dilution tunnel 102.

In various implementations, the emissions test system 100 may include only one of the upstream and downstream blowers 106 and 108. The upstream blower 106 and/or the downstream blower 108 may be controlled to force a constant volume of diluted exhaust gas through the dilution tunnel 102. In this regard, the emissions test system 100 may be a CVS system.

The sample collectors 110 collect the diluted exhaust gas sample extracted by the sample probe 104. The sample collectors 110 may be sample bags or sample filters. The sample collectors 110 include a first sample collector 110-1 and a second sample collector 110-2. The sample collector supply line 124 splits into a first supply line 124-1 and a second supply line 124-2 that supply the diluted exhaust gas sample to the sample collectors 110-1 and 110-2, respectively. A valve 134-1 may be disposed in the first supply line 124-1, and the valve 134-1 may be opened or closed to allow or prevent the flow of the diluted exhaust gas sample to the first sample collector 110-1. Similarly, a valve 134-2 may be disposed in the second supply line 124-2, and the valve 134-2 may be opened or closed to allow or prevent the flow of diluted exhaust gas sample to the second sample collector 110-2.

The emissions analyzer 114 analyzes the diluted exhaust gas sample collected by the sample collectors 110 to determine the concentration of emissions contained therein. The emissions analyzer 114 outputs a first emissions concentration (EC1) signal 135 indicating the concentration of emissions contained in the diluted exhaust gas sample. The diluted exhaust gas sample is sent from the sample collectors 110 to the emissions analyzer 114 through an analyzer supply line 136. The analyzer supply line 136 includes a first supply line 136-1 extending from the first sample collector 110-1 and a second supply line 136-2 extending from the second sample collector 110-2. A valve 138-1 may be disposed in the first supply line 136-1, and the valve 138-1 may be opened or closed to allow or prevent the flow of the diluted exhaust gas sample to the emissions analyzer 114. Similarly, a valve 138-2 may be disposed in the second supply line 136-2, and the valve 134-2 may be opened or closed to allow or prevent the flow of diluted exhaust gas sample to the emissions analyzer 114.

A pump 140 may be disposed in the analyzer supply line 136, and the speed of the pump 140 may be adjusted to adjust the rate at which the diluted exhaust gas sample flows from the sample collectors 110 to the emissions analyzer 114. Additionally or alternatively, a valve 142 may be disposed in the analyzer supply line 136, and the position of the valve 142 may be adjusted to adjust the rate at which the diluted exhaust gas sample flows from the sample collectors 110 to the emissions analyzer 114. In one example, the pump 140 is operated at a constant speed, and the position of the valve 142 is adjusted to adjust the rate at which the diluted exhaust gas sample flows from the sample collectors 110 to the emissions analyzer 114.

The background collectors 112 collect a sample of the dilution gas flowing through the dilution gas supply line 120. A background collector supply line 144 supplies the dilution gas sample from the dilution gas supply line 120 to the background collectors 112. A valve 146 may be disposed in the background collector supply line 144, and the position of the valve 146 may be adjusted to adjust the rate at which the dilution gas sample is extracted from the dilution gas supply line 120. Additionally or alternatively, a pump 148 may be disposed in the background collector supply line 144, and the speed of the pump 148 may be adjusted to adjust the rate at which the dilution gas sample is extracted from the dilution gas supply line 120. In one example, the pump 148 is operated at a constant speed, and the position of the valve 146 is adjusted to adjust the extraction rate of the dilution gas sample.

The background collectors 112 may be background bags or background filters. The background collectors 112 include a first background collector 112-1 and a second background collector 112-2. The background collector supply line 144 splits into a first supply line 144-1 and a second supply line 144-2 that supply the dilution gas sample to the background collectors 112-1 and 112-2, respectively. A valve 150-1 may be disposed in the first supply line 144-1, and the valve 150-1 may be opened or closed to allow or prevent the flow of the diluted exhaust gas sample to the first background collector 112-1. Similarly, a valve 150-2 may be disposed in the second supply line 144-2, and the valve 150-2 may be opened or closed to allow or prevent the flow of diluted exhaust gas sample to the second background collector 112-2.

The dilution gas sample is sent from the background collectors 112 to the emissions analyzer 114 through the analyzer supply line 136. The analyzer supply line 136 further includes a third supply line 136-3 extending from the first background collector 112-1 and a fourth supply line 136-4 extending from the second background collector 112-2. A valve 152-1 may be disposed in the third supply line 136-3, and the valve 152-1 may be opened or closed to allow or prevent the flow of the diluted exhaust gas sample to the emissions analyzer 114. Similarly, a valve 152-2 may be disposed in the fourth supply line 136-4, and the valve 152-2 may be opened or closed to allow or prevent the flow of diluted exhaust gas sample to the emissions analyzer 114.

The emissions analyzer 114 analyzes the dilution gas sample collected by the background collectors 112 to determine the concentration of emissions contained therein. The emissions analyzer 114 may account for the concentration of emissions contained in the dilution gas sample when determining the concentration of emissions contained in the diluted exhaust gas sample. For example, if the mass of the dilution gas in the diluted exhaust gas sample is equal to the mass of the dilution gas in the dilution gas sample, the emissions analyzer 114 may subtract the concentration of emissions in the dilution gas sample from the concentration of emissions in the diluted exhaust gas sample to obtain the concentration of emissions in the exhaust gas contained in the diluted exhaust gas sample. Instead of or in addition to determining the concentration of emissions contained in the diluted exhaust gas sample based on the concentration of emissions contained in the dilution gas sample, the emissions analyzer 114 may output a second emissions concentration (EC2) signal 153 indicating the concentration of emissions contained in the dilution gas sample.

The emissions test system 100 further includes an emissions test system (ETS) control module 154 that controls various actuators of the emissions test system 100 based on signals received from various sensors of the emissions test system 100. The actuators of the emissions test system 100 include the blowers 106, 108, the valves 122, 126, 132, 134-1, 134-2, 138-1, 138-2, 150-1, 150-2, 152-1, 152-2, and the pumps 128, 140, 148. The sensors of the emissions test system 100 include an exhaust emissions concentration (EEC) sensor 156, an exhaust pressure (EXP) sensor 158, a dilution gas flow meter 160, and a diluted exhaust flow meter 162.

The ETS control module 154 outputs various control signals to control the actuators of the emissions test system 100. The control signals that are output by the ETS control module 154 include blower control signals 164, 166, valve control signals 168, 170, 172, 174-1, 172-4, 176-1, 176-2, 178, 180, 182, 184, and pump control signals 186, 188, 190. The blower control signals 164, 166 indicate a target duty cycle or target speed of the blowers 106, 108, respectively. The valve control signals 168, 170, 172, 174-1, 174-2, 176-1, 176-2, 178, 180, 182, 184 indicate a target position of the valves 122, 126, 132, 134-1, 134-2, 138-1, 138-2, 150-1, 150-2, 152-1, 152-2, respectively. The pump control signals 186, 188, 190 indicate a target duty cycle or target speed of the pumps 128, 140, 148, respectively. For sake of clarity, the control signals output by the ETS control module 154 are not shown in FIG. 1 as extending all the way to their corresponding actuators. However, it should be understood that the ETS control module 154 communicates these control signals to their corresponding actuator through a hardwired or wireless connection.

The EEC sensor 156 measures the concentration of emissions in exhaust gas flowing through the exhaust gas supply line 118 and outputs an EEC signal 191 indicating the exhaust gas emissions concentration. The EXP sensor 158 measures the pressure of exhaust gas flowing through the exhaust gas supply line 118 and outputs an EXP signal 193 indicating the exhaust gas supply line pressure. The EXP sensor 158 may measure the exhaust gas supply line pressure at a frequency that is greater than or equal to 1 kilohertz. The dilution gas flow meter 160 measures the flow rate of dilution gas in the dilution supply line 120 at a location upstream of the dilution tunnel 102 and outputs a signal 195 indicating the dilution gas flow rate. The diluted exhaust flow meter 162 measures the flow rate of diluted exhaust gas in the dilution tunnel exhaust line 130 at a location downstream of the dilution tunnel 102 and outputs a signal 197 indicating the diluted exhaust flow rate. For sake of clarity, the signals output by the sensors of the emissions test system 100 are not shown in FIG. 1 as extending all the way to the ETS control module 154. However, it should be understood that the sensors of the emissions test system 100 communicate these signals to the ETS control module 154 through a hardwired or wireless connection.

The ETS control module 154 determines whether the engine 116 is on or off, and makes control decisions and/or emissions mass determinations based on whether the engine 116 is on or off. In one example, the ETS control module 154 adjusts or corrects the exhaust gas emissions concentration measured by the EEC sensor 156 based on whether the engine 116 is on or off. In another example, the ETS control module 154 controls various actuators of the emissions test system 100 to allow or prevent the flow of diluted exhaust gas to the sample collectors 110, and to allow or prevent the flow of dilution gas to the background collectors 112, based on whether the engine 116 is on or off. The ETS control module 154 determines whether the engine 116 is on or off based on the magnitudes and/or frequency of pulsations in the EXP signal 193 indicating the exhaust gas supply line pressure.

During an emissions test schedule, the ETS control module 154 controls the blower 106 to force diluted exhaust gas through the dilution tunnel 102 at a target flow rate and/or controls the blower 108 to draw diluted exhaust gas through the dilution tunnel 102 at the target flow rate. In addition, the ETS control module 154 controls the valves 126, 134-1, 134-2 to extract samples of diluted exhaust gas from the dilution tunnel 102 and to send the samples of the diluted exhaust gas to the sample collectors 110. Further, the ETS control module 154 controls the valves 146, 150-1, 150-2 to extract samples of dilution gas from the dilution gas supply line 120 and to send the samples of the dilution gas to the background containers 112. The ETS control module 154 directs dilution gas to the background containers 112 when the ETS control module directs diluted exhaust gas to the sample collectors 110.

An emissions test schedule may include multiple test phases. For example, the U.S. Environmental Protection Agency (EPA) Federal Test Procedure includes a cold start phase, a cold stabilized phase, and a hot start phase. During each test phase, the ETS control module 154 may direct the diluted exhaust gas to a different one of the sample collectors 110 and direct the dilution gas to a different one of the background collectors 112. Thus, since an emission test schedule may include more than two phases, the emissions test system 100 may include more than two of the sample collectors 110 and more than two of the background collectors 112.

When allowing diluted exhaust gas to flow to the sample collector 110-1, the ETS control module 154 at least partially opens the valve 126 and fully opens the valve 134-1. When preventing the flow of diluted exhaust gas to the sample collector 110-1, the ETS control module 154 fully closes the valve 126 and/or the valve 134-1. When allowing diluted exhaust gas to flow to the sample collector 110-2, the ETS control module 154 at least partially opens the valve 126 and fully opens the valve 134-2. When preventing the flow of diluted exhaust gas to the sample collector 110-2, the ETS control module 154 fully closes the valve 126 and/or the valve 134-2.

When allowing dilution gas to flow to the background collector 112-1, the ETS control module 154 at least partially opens the valve 146 and fully opens the valve 144-1. When preventing the flow of dilution gas to the background collector 112-1, the ETS control module 154 fully closes the valve 146 and/or the valve 144-1. When allowing dilution gas to flow to the background collector 112-2, the ETS control module 154 at least partially opens the valve 146 and fully opens the valve 144-2. When preventing the flow of dilution gas to the background collector 112-2, the ETS control module 154 fully closes the valve 146 and/or the valve 144-2.

In various implementations, the emissions test system 100 further includes vent lines 198 and 199 extending from the sample collector supply line 124 and the background collector supply line 144, respectively, and valves 198-1 and 199-1 disposed in the vent lines 198 and 199, respectively. The ETS control module 154 may open the valve 198-1 to vent diluted exhaust gas extracted from the dilution tunnel 102, and thereby prevent the flow of diluted exhaust gas from the dilution tunnel 102 to the sample collectors 110, instead of or in addition to closing the valves 134-1, 134-2. Similarly, the ETS control module 154 may open the valve 199-1 to vent dilution gas extracted from the dilution gas supply line 120, and thereby prevent the flow of dilution gas from the dilution gas supply line 120 to the background collectors 112, instead of or in addition to closing the valves 150-1, 150-2.

During each test phase of an emissions test schedule, the ETS control module 154 determines whether the engine 116 is on or off, and allows or prevents the flow of diluted exhaust gas from the dilution tunnel 102 to one of the sample collectors 110 based on whether the engine 116 is on or off. For example, during the cold start phase, the ETS control module 154 may allow the flow of diluted exhaust gas from the dilution tunnel 102 to the sample collector 110-1 when the engine 116 is on, and prevent the flow of diluted exhaust gas from the dilution tunnel 102 to the sample collector 110-1 when the engine 116 is off. Then, during the cold stabilized phase, the ETS control module 154 may allow the flow of diluted exhaust gas from the dilution tunnel 102 to the sample collector 110-2 when the engine 116 is on, and prevent the flow of diluted exhaust gas from the dilution tunnel 102 to the sample collector 110-2 when the engine 116 is off. In addition, the ETS control module 154 may prevent the flow of diluted exhaust gas from the dilution tunnel 102 to the sample collector 110-2 during the entire cold start phase, and prevent the flow of diluted exhaust gas from the dilution tunnel 102 to the sample collector 110-1 during the entire cold stabilized phase.

Similarly, during each test phase of an emissions test schedule, the ETS control module 154 allows or prevents the flow of dilution gas from the dilution gas supply line 120 to one of the sample collectors 112 based on whether the engine 116 is on or off. For example, during the cold start phase, the ETS control module 154 may allow the flow of dilution gas from the dilution gas supply line 120 to the background collector 112-1 when the engine 116 is on, and prevent the flow of dilution gas from dilution gas supply line 120 to the background collector 112-1 when the engine 116 is off. Then, during the cold stabilized phase, the ETS control module 154 may allow the flow of dilution gas from the dilution gas supply line 120 to the background collector 112-2 when the engine 116 is on, and prevent the flow of dilution gas from the dilution gas supply line 120 to the background collector 112-2 when the engine 116 is off. In addition, the ETS control module 154 may prevent the flow of dilution gas from the dilution gas supply line 120 to the background collector 112-2 during the entire cold start phase, and prevent the flow of dilution gas from the dilution gas supply line 120 to the background collector 112-1 during the entire cold stabilized phase.

After each test phase, the ETS control module 154 controls the valves 138-1, 138-2, and/or 142 and the pump 140 to direct the sample of diluted exhaust gas from the sample collectors 110 to the emissions analyzer 114. For example, after the cold start phase, the ETS control module 154 may fully open the valves 138-1 and 142 and activate the pump 140 to direct the sample of diluted exhaust gas from the sample collector 110-1 to the emissions analyzer 114. Similarly, after the cold transient phase, the ETS control module 154 may fully open the valves 138-2 and 142 and activate the pump 140 to direct the sample of diluted exhaust gas from the sample collector 110-2 to the emissions analyzer 114.

In addition, after each test phase, the ETS control module 154 controls the valves 152-1, 152-2, and/or 142 and the pump 140 to direct the sample of dilution gas from the background collectors 112 to the emissions analyzer 114. For example, after the cold start phase, the ETS control module 154 may fully open the valves 152-1 and 142 and activate the pump 140 to direct the sample of dilution gas from the background collector 112-1 to the emissions analyzer 114. Similarly, after the cold transient phase, the ETS control module 154 may fully open the valves 152-2 and 142 and activate the pump 140 to direct the sample of dilution gas from the background collector 112-2 to the emissions analyzer 114.

Figure 2:
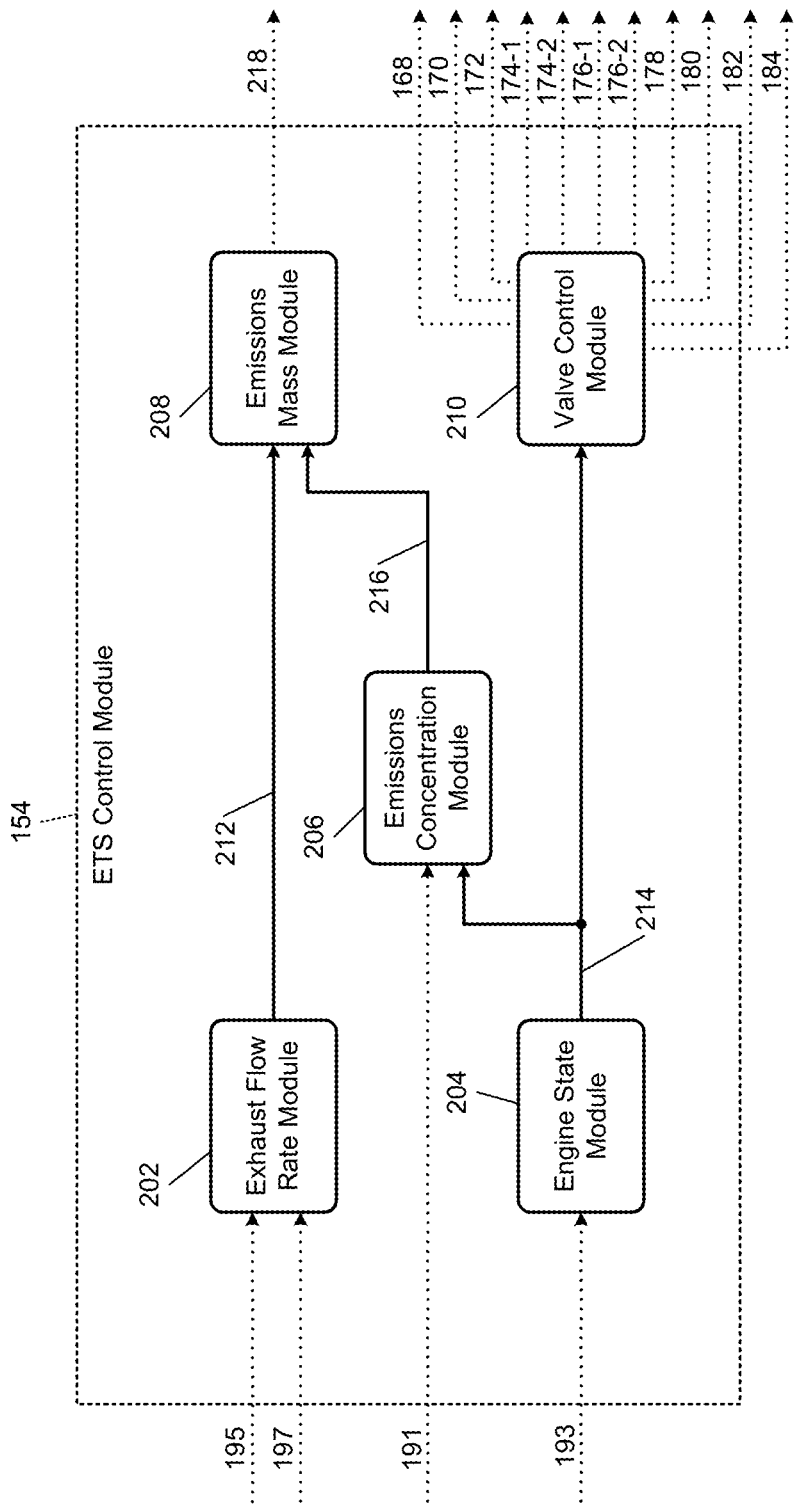
FIG. 2 is a functional block diagram of an example control module for controlling an emissions test system according to the principles of the present disclosure.

Referring now to FIG. 2, an example implementation of the ETS control module 154 includes an exhaust flow rate module 202, an engine state module 204, an emissions concentration module 206, an emissions mass module 208, and a valve control module 210. The exhaust flow rate module 202 determines the flow rate of exhaust gas flowing through the exhaust gas supply line 118 and outputs a signal 212 indicating the same. In one example, the exhaust flow rate module 202 subtracts the dilution gas flow rate indicated by the signal 193 from the diluted exhaust flow rate indicated by the signal 195 to obtain the flow rate of exhaust gas flowing through the exhaust gas supply line 118.

In various implementations, the flow rate of exhaust gas flowing through the exhaust gas supply line 118 may be obtained from an engine control module (not shown) and/or measured directly in the exhaust supply line 118. Alternatively, the exhaust flow rate module 202 may set the exhaust flow rate equal to a product of (i) the exhaust flow rate measured by the diluted exhaust flow meter 162 and (ii) a ratio of a concentration of an emission (e.g., carbon dioxide) in the exhaust gas supply line 118 to a concentration of the same emission in the dilution tunnel exhaust line 130. Before determining this ratio, the exhaust flow rate module 202 may subtract the concentration of the emission in the dilution supply line 120 from the concentration of the emission in the dilution tunnel exhaust line 130. The emissions test system 100 may include one or more sensors (not shown) that measure the concentration of the emission in the dilution supply line 120 and/or the dilution tunnel exhaust line 130. Alternatively, the concentration of the emission in the dilution supply line 120 may be a predetermined (e.g., fixed) value.

The engine state module 204 determines whether the engine 116 is on or off and outputs a signal 214 indicating the same. The engine state module 204 determines whether the engine 116 is on or off based on the magnitudes and/or frequency of pulsations in the EXP signal 193 indicating the exhaust gas supply line pressure. In one example, the engine state module 204 determines that the engine 116 is on when the magnitude of a pulsation in the EXP signal 193 is greater than a first value. In another example, the engine state module 204 determines that the engine 116 is on when the frequency of pulsations in the EXP signal 193 is greater than a first frequency.

The first frequency may be predetermined based on the number of cylinders in the engine 116 and the idle speed of the engine 116. For example, the first frequency may be set to a value that is less than or equal to a product of the number of cylinders in the engine 116 and the idle speed of the engine 116. The first value may also be predetermined. For example, the first value may be set to an expected change in the pressure of exhaust gas produced by the engine 116 due to a combustion event in a cylinder of the engine 116.

The engine state module 204 may determine whether the engine 116 is on or off based on both the magnitudes and frequency of pulsations in the EXP signal 193. For example, the engine state module 204 may identify pulsations in the EXP signal 193 that have a frequency greater than or equal to the first frequency (referred to herein as higher frequency pulsations), and determine the average value of the magnitudes of the pulsations identified. The engine state module 204 may then determine that the engine 116 is on when the average value of the magnitudes of the higher frequency pulsations is greater than or equal to the first value.

The emissions concentration module 206 determines a flow weighted mean concentration of emissions in exhaust gas flowing through the exhaust gas supply line 118 and outputs a signal 216 indicating the same. The emissions concentration module 206 determines a product of the emissions concentration measured by the EEC sensor 156 and the exhaust gas flow rate determined by the exhaust flow rate module 202. The emissions concentration module 206 then divides this product by an average rate at which exhaust gas flows through the exhaust gas supply line 118 during a test phase in order to obtain the flow weighted mean concentration. Thus, the flow weighted mean concentration represents a normalized concentration of emissions in the exhaust gas flowing through the exhaust gas supply line 118.

The flow weighted mean concentration may be used as an approximation or prediction of the emissions concentration that will be measured by the emissions analyzer 114 at the end of a test phase. Thus, the emissions analyzer 114 may adjust its emissions concentration measurement range based on flow weighted mean concentration indicated by the signal 216. In various implementations, rather than indicating the flow weighed mean concentration, the signal 216 may carry an instruction to the emissions analyzer 114 to adjust its emissions concentration measurement range to a target range. Adjusting the emissions concentration measurement range of the emissions analyzer 114 based on the flow weighted mean concentration ensures that the emissions analyzer 114 accurately measures the emissions concentration.

The emissions concentration module 206 determines the flow weighted mean concentration based on the emissions concentration measured by the EEC sensor 156 and whether the engine 116 is on or off. When the engine 116 is off, the emissions concentration measured by the EEC sensor 156 may not accurately reflect the concentration of emissions in exhaust gas produced by the engine 116. For example, when the engine 116 is off, stagnant (i.e., not flowing) exhaust gas may be present in the exhaust gas supply line 118 and/or exhaust gas may flow backwards from the dilution tunnel 102 to the engine 116. Thus, the EEC signal 191 output by the EEC sensor 156 may indicate the concentration of emissions in this stagnant or backflow exhaust gas rather than exhaust gas produced by the engine 116 at that time. Therefore, when the engine 116 is off, the emissions concentration module 206 may determine the flow weighted mean concentration independent of the EEC signal 191. For example, the when the engine 116 is off, the emissions concentration module 206 may set the flow weighted mean concentration equal to zero. Conversely, when the engine 116 is on, the emissions concentration module 206 may determine the flow weighted mean concentration based on the emissions concentration measured by the EEC sensor 156 as described above.

The emissions mass module 208 determines the mass of emissions in exhaust gas produced by the engine 102 and outputs a signal 218 indicating the same. The emissions mass module 208 determines the exhaust emissions mass based on the exhaust emissions concentration indicated by the signal 216 and the corresponding exhaust flow rate indicated by the signal 212. For example, the emissions mass module 208 may determine the product of the exhaust emissions concentration indicated by the signal 216 and the corresponding exhaust flow rate indicated by the signal 212 in order to obtain the mass flow rate of the exhaust emissions. The emissions mass module 208 may then determine a product of this mass flow rate and a corresponding period, or integrate the mass flow rate with respect to the period, to obtain the mass of emissions in exhaust gas produced by the engine 102 during that period.

The emissions mass module 208 may determine the emissions mass for multiple periods during a test phase, and then sum the emissions masses for all of the periods to obtain the emissions mass for the entire period of the test phase. The emissions mass module 208 may determine the emissions mass for each period based on whether the engine 116 is on or off. For example, when the engine 116 is on, the emissions mass module 208 may determine the emissions mass for each period in the manner described above. However, when the engine 116 is off, the emissions mass module 208 may set the emissions mass for each period equal to zero and/or stop integrating the mass flow rate with respect to each period.

In various implementations, the emissions test system 100 may include a flow meter (not shown) disposed upstream from the emissions analyzer 114 (e.g., between the valve 142 and the emissions analyzer 114) that measures the volumetric flow rate of samples analyzed by the emissions analyzer 114. In these implementations, the emissions mass module 208 may determine the mass of emissions in a sample based on the emissions concentration measured by the emissions analyzer 114, the volumetric flow rate measured by the flow meter, and a density of the sample. The density of a sample may be measured or assumed to be equal to the density of air at standard temperature and pressure (i.e., a predetermined value). In one example, the emissions mass module 208 determines the product of the emissions concentration measured by the emissions analyzer 114, the volumetric flow rate measured by the flow meter, and the density of a sample to obtain the mass flow rate of exhaust emissions in the sample. The emissions mass module 208 may then determine a product of this mass flow rate and a corresponding period, or integrate the mass flow rate with respect to the period, to obtain the mass of emissions in a portion of a sample entering the emissions analyzer 114 during that period. The emissions mass module 208 may sum the emissions masses determined for multiple periods during a test phase to obtain the emissions mass for an entire test phase.

When the emissions mass module 108 determines the emissions mass based on the emissions concentration measured by the emissions analyzer 114, the emissions mass module 208 may determine the emissions mass for each period based on whether the engine 116 is on or off. For example, when the engine 116 is on, the emissions mass module 208 may determine the emissions mass for each period during a test phase based on the emissions concentration measured by the emissions analyzer 114 in the manner described above. However, when the engine 116 is off, the emissions mass module 208 may set the emissions mass for each period equal to zero and/or stop integrating the mass flow rate with respect to each period.

The emissions mass module 208 may determine the mass of emissions in each of the diluted exhaust gas sample and the dilution sample in the manner described above. For example, the emissions mass module 208 may determine the mass of emissions in the diluted exhaust gas sample based on the EC1 signal 135 from the emissions analyzer 114 and the flow rate measured by the flow meter disposed upstream from the emissions analyzer 114. In another example, the emissions mass module 208 may determine the mass of emissions in the dilution sample based on the EC2 signal 153 from the emissions analyzer 114 and the flow rate measured by the flow meter disposed upstream from the emissions analyzer 114. The emissions mass module 208 may then subtract the mass of emissions in the dilution sample from the mass of emissions in the diluted exhaust gas sample to obtain the mass of emissions in the exhaust gas contained within the diluted exhaust gas sample.

When determining the mass of emissions in the diluted exhaust gas sample or the mass of emissions in the dilution sample, the emissions mass module 208 may determine the emissions mass based on whether the engine 116 is on or off. For example, when the engine 116 is on for a period, the emissions mass module 208 may determine the emissions mass for that period based on the emissions concentration measured by the emissions analyzer 114 in the manner described above. However, when the engine 116 is off for a period, the emissions mass module 208 may set the emissions mass for that period equal to zero and/or stop integrating the mass flow rate with respect to the period. The emissions mass module 208 may determine the emissions mass based on whether the engine 116 is on or off for multiple periods while a sample is sent to the emissions analyzer 114. The emissions mass module 208 may then sum the emissions masses for all of the periods to obtain the mass of emissions in the diluted exhaust gas sample or the mass of emissions in the dilution sample.

The emissions mass determined by the emissions mass module 208 based on the emissions concentration measured by the EEC sensor 156 may be used to in addition to or in place of the emissions mass determined by the emissions mass module 208 based on the emissions concentrations measured by the emissions analyzer 114. In one example, the emissions mass determined by the emissions mass module 208 based on the emission concentrations measured by the EEC sensor 156 may be used to check the accuracy of the emissions mass determined based on the emissions concentrations measured by the emissions analyzer 114. In another example, the emissions mass module 208 may be used to determine the mass of certain emissions, and the emissions analyzer 114 may be used to determine the mass of other emissions.

The valve control module 210 generates one or more of the valve control signals 168, 170, 172, 174-1, 172-4, 176-1, 176-2, 178, 180, 182, 184 to control the valves 122, 126, 132, 134-1, 134-2, 138-1, 138-2, 150-1, 150-2, 152-1, 152-2, respectively. The valve control module 210 may also generates control signals to control the valves 198-1, 199-1. The valve control module 210 controls the valves 122, 126, 132, 134-1, 134-2, 138-1, 138-2, 150-1, 150-2, 152-1, 152-2, 198-1, 199-1 in the manner described above with reference to the ETS control module 154 of FIG. 1. In this regard, when the ETS control module 154 is described herein as controlling the valves 122, 126, 132, 134-1, 134-2, 138-1, 138-2, 150-1, 150-2, 152-1, 152-2, 198-1, 199-1 in a certain way, it should be understood that the valve control module 210 performs these valve control actions.

In one example, the valve control module 210 controls the valves 126, 134-1, and/or 134-2 to regulate flow of the diluted exhaust gas from the dilution tunnel 102 to the sample collectors 110 based on whether the engine 116 is on or off. When the engine 116 is off, the valve control module 210 closes the valves 126, 134-1, and 134-2, and thereby prevents the flow of diluted exhaust gas from the dilution tunnel 102 to the sample collectors 110. When the engine 116 is on, the valve control module 210 opens the valve 126 and one of the valves 134-1 and 134-2, and thereby allows the flow of diluted exhaust gas from the dilution tunnel 102 to one of the sample collectors 110.

In another example, the valve control module 210 controls the valves 146, 150-1, and/or 150-2 to regulate flow of the diluted exhaust gas from the dilution gas supply line 120 to the background collectors 112 based on whether the engine 116 is on or off. When the engine 116 is off, the valve control module 210 closes the valves 146, 150-1, and 150-2, and thereby prevents the flow of dilution gas from the dilution gas supply line 120 to the background collectors 112. When the engine 116 is on, the valve control module 210 opens the valve 146 and one of the valves 150-1 and 150-2, and thereby allows the flow of dilution gas from the dilution gas supply line 120 to one of the background collectors 112.

Figure 3:
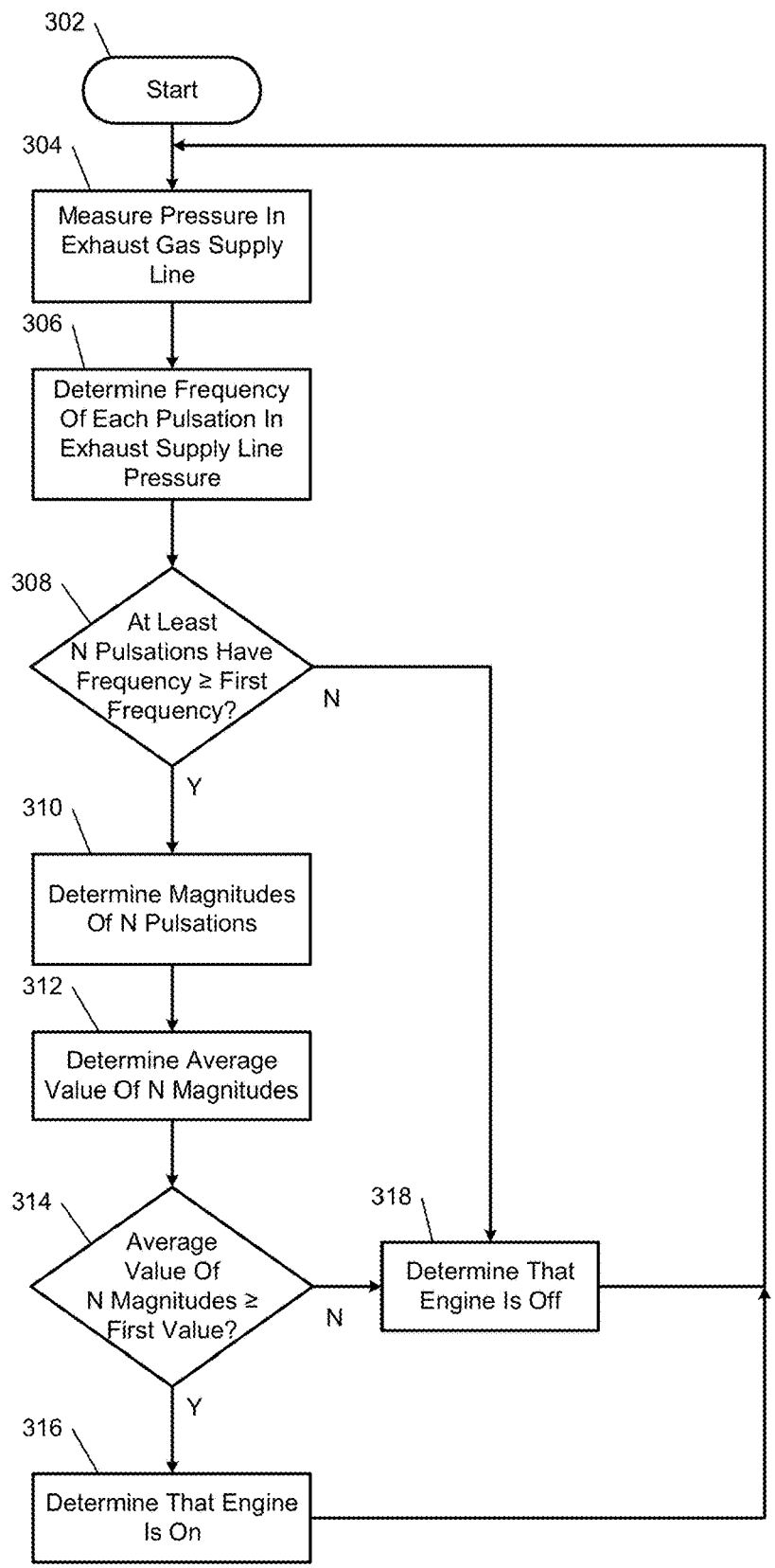
FIG. 3 is a flowchart illustrating an example method for determining whether an engine is on or off based on the pressure of exhaust gas produced by the engine according to the principles of the present disclosure.

Referring now to FIG. 3, an example method for determining whether the engine 116 is on or off based on the pressure of exhaust gas produced by the engine 116 begins at 302. The method of FIG. 3 is described in the context of the modules included in the example implementation of the ETS control module 154 shown in FIG. 2. However, the particular modules that perform the steps of the method of FIG. 3 may be different than those mentioned below and/or the method of FIG. 3 may be implemented apart from the modules of FIG. 2.

At 304, the EXP sensor 158 measures the pressure of exhaust gas flowing through the exhaust gas supply line 118. At 306, the engine state module 204 determines the frequency of each pulsation in the exhaust supply line pressure. At 308, the engine state module 204 determines whether at least N pulsations have a frequency that is greater than or equal to the first frequency. N may be a predetermined integer that is greater than one. If at least N pulsations have a frequency that is greater than or equal to the first frequency, the method continues at 310. Otherwise, the method continues at 318.

At 310, the engine state module 204 determines the magnitude of each of the N pulsations. In other words, the engine state module 204 determines N magnitudes of the N pulsations. At 312, the engine state module 204 determines the average value of the N magnitudes.

At 314, the engine state module 204 determines whether the average value of the N magnitudes is greater than or equal to the first value. If the average value of the N magnitudes is greater than or equal to a first value, the method continues at 316. Otherwise, the method continues at 318.

At 316, the engine state module 204 determines that the engine 116 is on. At 318, the engine state module 204 determines that the engine 116 is off. After 316 and 318, the method returns to 304 and continues to determines whether the engine 116 is on or off.

Figure 4:
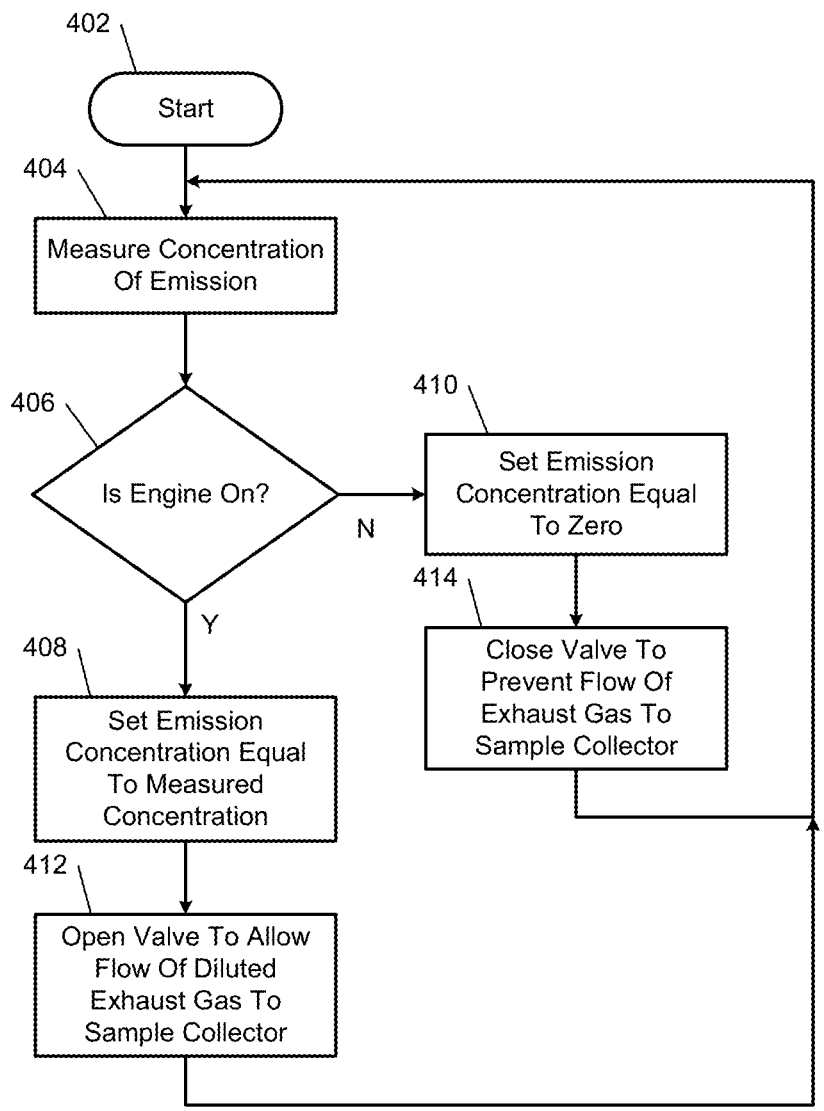
FIG. 4 is a flowchart illustrating an example method for controlling the flow of exhaust gas from a dilution tunnel to a sample collector based on whether an engine is on or off according to the principles of the present disclosure.

Referring now to FIG. 4, an example method for determining the concentration of emissions in exhaust gas produced by the engine 116 based on whether the engine 116 is on or off, and controlling the flow of exhaust gas from the dilution tunnel 102 to the sample collectors 110 based on whether the engine 116 is on or off, begins at 402. The method of FIG. 4 is described in the context of the modules included in the example implementation of the ETS control module 154 shown in FIG. 2. However, the particular modules that perform the steps of the method of FIG. 4 may be different than those mentioned below and/or the method of FIG. 4 may be implemented apart from the modules of FIG. 2.

At 404, The EEC sensor 156 measures the concentration of emissions in exhaust gas flowing through the exhaust gas supply line 118. At 406, the engine state module 204 determines whether the engine 116 is on using, for example, the method of FIG. 3. If the engine 116 is on, the method continues at 408. Otherwise, the method continues at 410.

At 408, the emissions concentration module 206 sets the exhaust emissions concentration equal to the emissions concentration measured by the EEC sensor 156. At 412, the valve control module 210 opens the valves 126, 134-1, and/or 134-2 to allow the flow of diluted exhaust gas from the dilution tunnel 102 to the sample collectors 110. After 412, the method returns to 404.

At 410, the emissions concentration module 206 sets the exhaust emissions concentration equal to zero. At 412, the valve control module 210 closes the valves 126, 134-1, and/or 134-2 to prevent the flow of diluted exhaust gas from the dilution tunnel 102 to the sample collectors 110. After 414, the method returns to 404.

Figure 5:
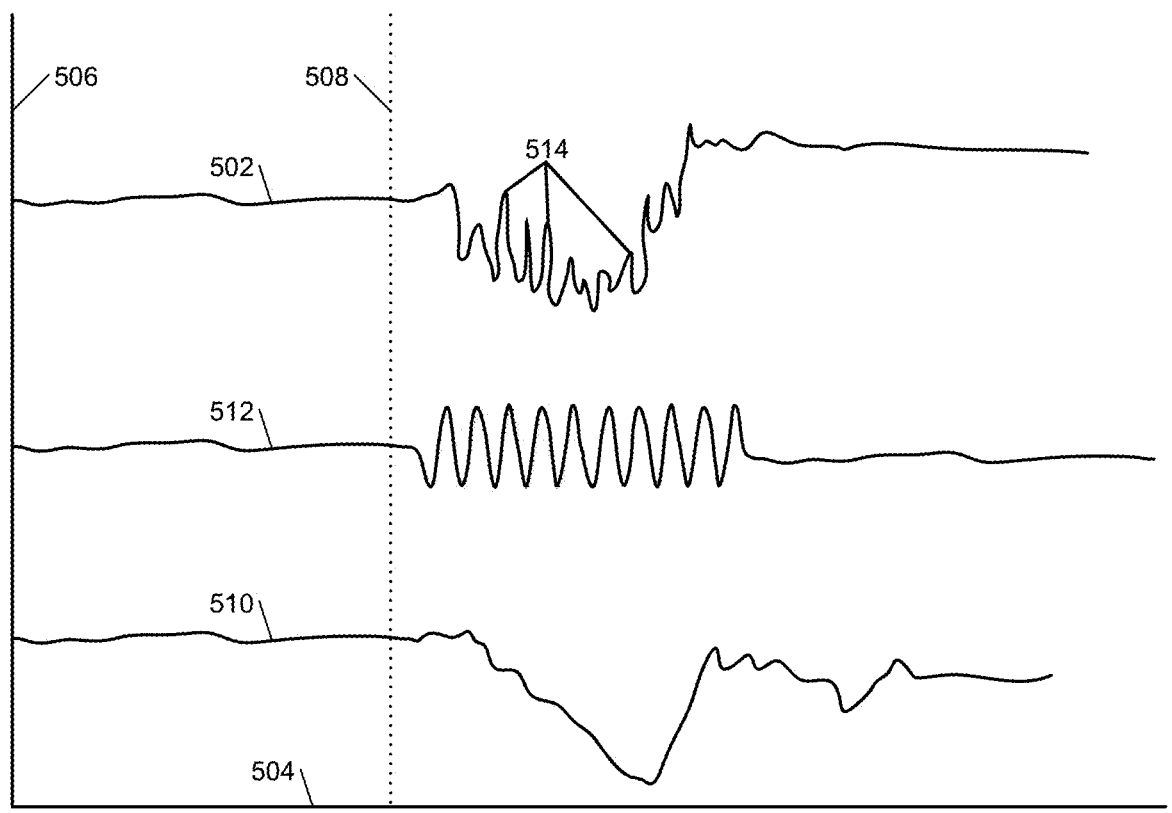

Referring now to FIG. 5, an example of the pressure of exhaust gas flowing through the exhaust gas supply line 118 as the engine 116 is switched from off to on is illustrated at 502. The exhaust gas supply line pressure 502 is plotted with respect to an x-axis 504 that represents time and a y-axis 506 that represents pressure. At 508, the engine 116 is switched from off to on.

The exhaust gas supply line pressure 502 includes both a low frequency component 510 and a high frequency component 512. In FIG. 5, the low and high frequency components 510 and 512 are shown for illustration purposes. However, in practicality the low and high frequency components 510 and 512 cannot be measured independently, but rather may only be obtain through signal filtering.

When the engine 116 is switched from off to on, the exhaust gas supply line pressure 502 experiences a plurality of pulsations 514 due to combustion events within cylinders of the engine 116. The pulsations 514 correspond to or comprise the high frequency component 512 of the exhaust gas supply line pressure 502. The engine state module 204 determines the magnitudes and/or frequencies of the pulsations 514, and determines whether the engine 116 is on or off based on the magnitudes and/or frequencies of the pulsations 514 as described above.

Figure 6:
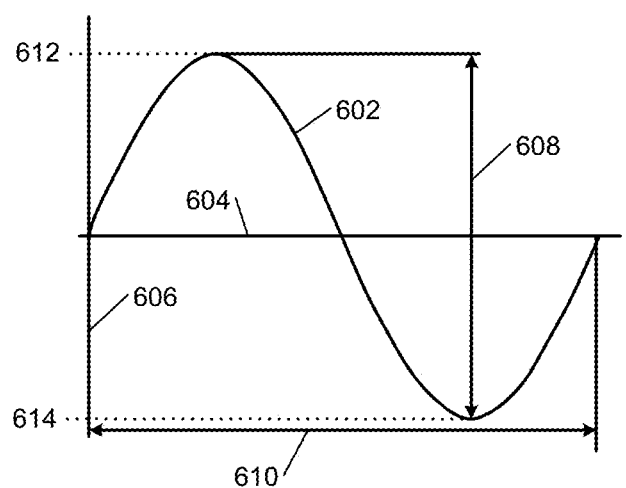
FIG. 6 is a graph illustrating example criteria used to determine whether an engine is on or off based on the pressure of exhaust gas produced by the engine.

Referring now to FIG. 6, an example of a pulsation 602 in the exhaust gas supply line pressure is plotted with respect to an x-axis 604 that represents time and a y-axis 606 that represents pressure. The pulsation 602 has a peak-to-peak amplitude 608 and a wave period 610. The peak-to-peak amplitude 608 is a difference between a maximum value 612 of the pulsation 602 and a minimum value 614 of the pulsation 602. The engine state module 204 may determine the inverse of the wave period 610 to obtain the frequency of the pulsation 602. The engine state module 204 may set the magnitude of the pulsation 602 equal to the peak-to-peak amplitude 608. Alternatively, the engine state module 204 may set the magnitude of the pulsation 602 equal to a difference between the maximum value 612 and a minimum value of a pulsation immediately before or after the pulsation 602. Alternatively, the engine state module 204 may set the magnitude of the pulsation 602 equal to a difference between the minimum value 614 and a maximum value of a pulsation immediately before or after the pulsation 602.

Figure 7:
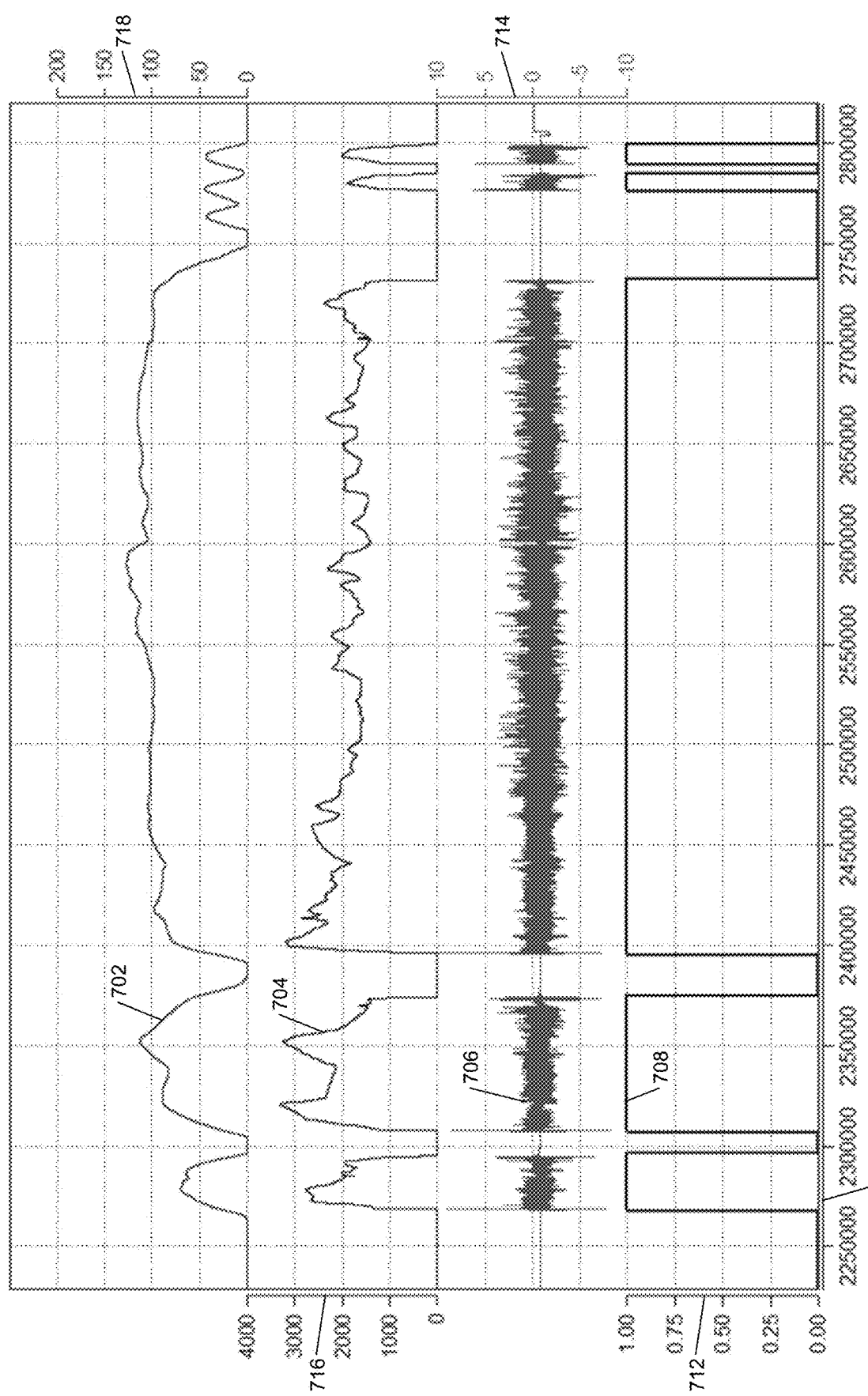
FIG. 7 is a graph illustrating an example vehicle speed signal, an example engine speed signal, an example exhaust pressure signal, and an example engine on/off determination signal according to the principles of the present disclosure.

Referring now to FIG. 7, examples of a vehicle speed signal 702, an engine speed signal 704, an exhaust pressure signal 706, and an engine on/off determination signal 708 over an Environmental Protection Agency (EPA) US06 test cycle are shown. The engine on/off determination signal 708 is plotted with respect to an x-axis 710 that represents time in milliseconds and a y-axis 712 that represents an engine state, where a value of 0 on the y-axis 712 indicates that the engine 116 is off and a value of 1 on the y-axis 712 indicates that the engine 116 is on. The exhaust pressure signal 706 is plotted with respect to the x-axis 710 and a y-axis 714 that represents pressure in millibars (mbar). The engine speed signal 704 is plotted with respect to the x-axis 710 and a y-axis 716 that represents engine speed in revolutions per minute (rpm). The vehicle speed signal 702 is plotted with respect to the x-axis 710 and a y-axis 718 that represents vehicle speed in kilometers per hour (kph).

The engine on/off determination signal 708 indicates the result of determining whether the engine 116 is on or off according to the teachings of the present disclosure. The exhaust pressure signal 706 indicates the pressure of exhaust gas flowing through the exhaust gas supply line 118 during the period represented by the x-axis 710. The engine speed signal 704 indicates the speed of the engine 116 during the period represented by the x-axis 710. The vehicle speed signal 702 indicates the speed of a vehicle propelled by the engine 116.

The engine on/off determination signal 708 is generated based on the exhaust pressure signal 706 using the techniques of the present disclosure for determining whether the engine 116 is on or off based on the exhaust gas supply line pressure. The engine speed signal 704 indicates that those techniques are effective. To this end, the engine on/off determination signal 708 indicates that the engine 116 is on when the engine speed signal 704 indicates that the speed of the engine 116 is greater than zero. Conversely, the engine on/off determination signal 708 indicates that the engine 116 is off when the engine speed signal 704 indicates that the engine speed is equal to zero.

In contrast to the engine speed signal 704, the vehicle speed signal 702 indicates that the vehicle speed is greater than zero at times when the engine on/off determination signal 708 indicates that the engine 116 is off. However, this has no bearing on the effectiveness of the techniques of the present disclosure for determining whether the engine 116 is on or off based on the exhaust gas supply line pressure. To this end, the vehicle is a hybrid vehicle that can be propelled solely by an electric motor at times. Thus, the engine 116 may be off when the vehicle speed is greater than zero at times when the vehicle is propelled by the electric motor alone.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, ETS.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, ETS.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, ETS. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a pressure sensor configured to measure pressure in an exhaust gas supply line that supplies exhaust gas from an engine to an emissions measurement system, the emissions measurement system including a dilution tunnel, a sample probe, and a sample collector, wherein the exhaust gas is diluted with a dilution gas in the dilution tunnel, and the sample probe supplies a portion of the diluted exhaust gas to the sample collector; and
an engine state module configured to determine whether the engine is on or off based on at least one of:
a frequency of pulsations in the exhaust gas supply line pressure; and
a magnitude of the pulsations in the exhaust gas supply line pressure.

2. The system of claim 1 wherein the engine state module is configured to determine that the engine is on when the frequency of the pulsations in the exhaust gas supply line pressure is greater than or equal to a predetermined frequency.

3. The system of claim 1 wherein the engine state module is configured to determine that the engine is on when the magnitude of the pulsations in the exhaust gas supply line pressure is greater than or equal to a predetermined value.

4. The system of claim 3 wherein the engine state module is configured to determine the magnitude of the pulsations in the exhaust gas supply line pressure based on a difference between a maximum value of one of the pulsations and a minimum value of one of the same pulsation or one of the pulsations immediately before or after the same pulsation.

5. The system of claim 1 wherein the engine state module is configured to determine whether the engine is on or off based on both the frequency of the pulsations in the exhaust gas supply line pressure and the magnitude of the pulsations in the exhaust gas supply line pressure.

6. The system of claim 5 wherein the engine state module is configured to:
identify N of the pulsations that have a frequency which is greater than or equal to a predetermined frequency; and
determine whether the engine is on or off based on the magnitudes of the N pulsations, wherein N is an integer.

7. The system of claim 6 wherein the engine state module is configured to determine that the engine is on when an average value of the magnitudes of the N pulsations is greater than or equal to a predetermined value, wherein N is greater than one.

8. The system of claim 1 wherein the pressure sensor is configured to measure the exhaust gas supply line pressure at a frequency that is greater than or equal to 1 kilohertz.

9. The system of claim 1 further comprising:
an emissions concentration sensor configured to measure a concentration of an emission in the exhaust gas; and
an emissions mass module configured to determine a mass of the emission in the exhaust gas based on the measured emission concentration and whether the engine is on or off.

10. The system of claim 1 further comprising a valve control module configured to control a valve to regulate flow of the diluted exhaust gas from the dilution tunnel to the sample collector based on whether the engine is on or off.

11. A method comprising:
measuring pressure in an exhaust gas supply line that supplies exhaust gas from an engine to an emissions measurement system, the emissions measurement system including a dilution tunnel, a sample probe, and a sample collector, wherein the exhaust gas is diluted with a dilution gas in the dilution tunnel, and the sample probe supplies a portion of the diluted exhaust gas to the sample collector; and
determining whether the engine is on or off based on at least one of:
a frequency of pulsations in the exhaust gas supply line pressure; and
a magnitude of the pulsations in the exhaust gas supply line pressure.

12. The method of claim 11 further comprising determining that the engine is on when the frequency of the pulsations in the exhaust gas supply line pressure is greater than or equal to a predetermined frequency.

13. The method of claim 11 further comprising determining that the engine is on when the magnitude of the pulsations in the exhaust gas supply line pressure is greater than or equal to a predetermined value.

14. The method of claim 13 further comprising determining the magnitude of the pulsations in the exhaust gas supply line pressure based on a difference between a maximum value of one of the pulsations and a minimum value of one of the same pulsation or one of the pulsations immediately before or after the same pulsation.

15. The method of claim 11 further comprising determining whether the engine is on or off based on both the frequency of the pulsations in the exhaust gas supply line pressure and the magnitude of the pulsations in the exhaust gas supply line pressure.

16. The method of claim 15 further comprising:
identifying N of the pulsations that have a frequency which is greater than or equal to a predetermined frequency; and
determining whether the engine is on or off based on the magnitudes of the N pulsations, wherein N is an integer.

17. The method of claim 16 further comprising determining that the engine is on when an average value of the magnitudes of the N pulsations is greater than or equal to a predetermined value, wherein N is greater than one.

18. The method of claim 11 further comprising measuring the exhaust gas supply line pressure at a frequency that is greater than or equal to 1 kilohertz.

19. The method of claim 11 further comprising:
measuring a concentration of an emission in the exhaust gas; and
determining a mass of the emission in the exhaust gas based on the measured emission concentration and whether the engine is on or off.

20. The method of claim 11 further comprising controlling a valve to regulate flow of the diluted exhaust gas from the dilution tunnel to the sample collector based on whether the engine is on or off.

\* \* \* \* \*